United States Patent
Ito et al.

(10) Patent No.: US 6,625,502 B2
(45) Date of Patent: Sep. 23, 2003

(54) AUTOMATIC SPEED LOOP GAIN ADJUSTMENT METHOD AND APPARATUS FOR A FEEDBACK CONTROL SYSTEM

(75) Inventors: Takamichi Ito, Namazu (JP); Jun Fujita, Mishima (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 95 days.

(21) Appl. No.: 09/737,821

(22) Filed: Dec. 18, 2000

(65) Prior Publication Data

US 2001/0020192 A1 Sep. 6, 2001

(30) Foreign Application Priority Data

Dec. 16, 1999 (JP) ............................................. 11-357474

(51) Int. Cl.[7] ............................................... G05B 13/02
(52) U.S. Cl. ............................ 700/69; 700/69; 700/38; 700/37
(58) Field of Search ............................ 700/13, 19, 20, 700/26, 28, 32, 33, 37–40, 45, 46, 54, 55, 63, 69, 71, 72, 170, 173, 188, 193, 302, 304; 455/240.1; 369/44.35; 340/648; 318/560–568.25, 601, 608

(56) References Cited

U.S. PATENT DOCUMENTS

| 4,549,123 | A | * | 10/1985 | Hagglund et al. | ............ | 318/610 |
|---|---|---|---|---|---|---|
| 4,675,805 | A | * | 6/1987 | Freymann | .................... | 364/162 |
| 4,882,526 | A | * | 11/1989 | Iino et al. | .................... | 318/561 |
| 5,394,322 | A | * | 2/1995 | Hansen | .................... | 364/148 |
| 5,587,899 | A | * | 12/1996 | Ho et al. | .................... | 364/157 |
| 5,974,434 | A | * | 10/1999 | Rose | .......................... | 708/322 |
| 6,263,251 | B1 | * | 7/2001 | Rutschmann | ................ | 700/37 |
| 6,281,650 | B1 | * | 8/2001 | Yutkowitz | .................... | 318/561 |
| 2002/0019715 | A1 | * | 2/2002 | Cohen et al. | ................. | 702/75 |
| 2002/0022903 | A1 | * | 2/2002 | Krah et al. | ................. | 700/170 |

FOREIGN PATENT DOCUMENTS

JP  2001-175303  *  6/2001  ........... G05B/13/02

* cited by examiner

Primary Examiner—Leo Picard
Assistant Examiner—Sean Shechtman
(74) Attorney, Agent, or Firm—Pillsbury Winthrop LLP

(57) ABSTRACT

Automatic speed loop gain adjustment of a feedback control system begins by setting up a phase margin range and a gain margin range. A speed open loop condition is provided by separating a speed command value from a speed feedback value. White noise is input into the feedback control system where the speed open loop condition has been made. A phase margin and a gain margin are then detected and comparisons are made with the phase margin range and the gain margin range, respectively. The speed loop gain is adjusted if the comparison results for either one of the detected phase margin and the detected gain margin fall outside of the associated phase margin range or gain margin range. Once the adjustment of the speed loop gain is complete, the position loop gain of the position control loop is adjusted on the basis of the adjusted speed loop gain.

10 Claims, 6 Drawing Sheets

AUTOMATIC SPEED LOOP GAIN ADJUSTMENT METHOD AND APPARATUS FOR A FEEDBACK CONTROL SYSTEM

BACKGROUND OF THE INVENTION

I. Field of the Invention

The invention relates generally to automatically controlling the speed of a moving object and, more particularly, to automatically adjusting the speed loop gain of a feedback control system used in, for example, a numerical control system controlling a machine tool, a robot, or the like.

II. Description of Related Art

In a controlled machine tool, various parameters affecting the characteristics of a feedback control system must be set by a manual input operation for the final optimization adjustment of the feedback control system. Generally, a feedback control system for systems equipped with servomotors, such as a machine tool, robot, etc., is divided into a position control loop, a speed control loop, and a current control loop. The speed control loop generates a speed command corresponding to the difference between a speed command from the position control loop and an actual motor speed. The speed control loop has a response characteristic that is determined in dependence on the speed loop gain. That is, when the speed loop gain is excessively small, the motor rotation will not immediately follow each movement command pulse supplied from the servo system and a control lag occurs in such a way that the motor cannot start rotating before a plurality of pulses are accumulated, thus causing a low-frequency undulation in the motor speed. Further, the servo system is liable to be effected by disturbance. On the other hand, when the speed loop gain is excessively large, the control stability is degraded.

A conventional optimization adjustment procedure for the feedback control system requires operators to examine the accuracy of motions of the machine tool. During optimization, the parameters are determined by a trial and error method while examining the accuracy of motions by using measuring instruments. The adjustment operation of a feedback control system requires operators with considerable experience and high skill to keep the feedback control system in optimum condition, because important characteristics of the feedback control system conflict with each other. Stability is deteriorated if accuracy and response characteristics are enhanced and vice versa. Currently, numerically controlled machine tools and industrial robots require a feedback control system having highly improved performance, resulting in more operations for optimization that become time consuming and complicated.

Accordingly, there is a need for an automatic speed loop gain adjustment method and apparatus for a feedback control system.

SUMMARY OF THE INVENTION

The present invention provides an automatic speed loop gain method and apparatus for a feedback control system. We automatically adjust the speed loop gain of a feedback control system by setting up a predetermined phase margin range and a predetermined gain margin range. We provide a speed open loop condition by separating a value of speed command from a speed feedback value. White noise is input into the feedback control system where the speed open loop condition has been made in a cycle that is substantially the same as a control cycle of the feedback control system. We detect a phase margin and a gain margin at the time the white noise is input into the feedback control system. Then, we compare the detected phase margin and the detected gain margin with the predetermined phase margin range and the predetermined gain margin range, respectively. We then adjust the speed loop gain if the comparison results for either one of the detected phase margin and the detected gain margin fall outside of the associated predetermined phase margin range or predetermined gain margin range. Adjusting the speed loop gain is effected by increasing the speed loop gain in a stepping state according to a predetermined unit quantity that is set up as a parameter beforehand, wherein the speed loop gain does not exceed a predetermined speed loop gain range. We stop adjusting the speed loop gain if the comparison results of both the detected phase margin and the detected gain margin fall within the associated predetermined phase margin range and predetermined gain margin range. Additionally, we can adjust the position loop gain of the position control loop once the adjustment of the speed loop gain is complete, wherein the position loop gain is adjusted on the basis of the adjusted speed loop gain.

An automatic speed loop gain adjustment arrangement for carrying out the above described method includes a position control unit to receive a position command value and a feedback position value to produce and output a speed command value based on a deviation between the received position command value and the feedback position value, a speed control unit to receive a speed command and a speed feedback value to produce and output a current command based on a deviation between the received value of the speed command and the feedback speed value, and a current control means receiving a current command and a feedback current value to produce and output a current command value based on a deviation between the received value of the current command and the feedback current value. We also provide the automatic speed loop gain arrangement with a white noise input element between the position control unit and the speed control unit to inhibit the transfer of the speed command to the speed command unit upon reception of white noise. In addition, we provide gain margin and phase margin determination elements to determine a phase margin and a gain margin upon reception of white noise by the white noise input element, a comparison element to compare the determined phase margin with a predetermined phase margin range and the determined gain margin with a predetermined gain margin range, and speed loop gain adjustment element to adjust a speed loop gain if the comparison element determines if either one of the determined phase margin and the determined gain margin falls outside of the associated predetermined phase margin range or predetermined gain margin range. The automatic speed loop adjustment arrangement may also include a position loop gain adjustment element to adjust the position loop gain on the basis of the adjusted speed loop gain.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
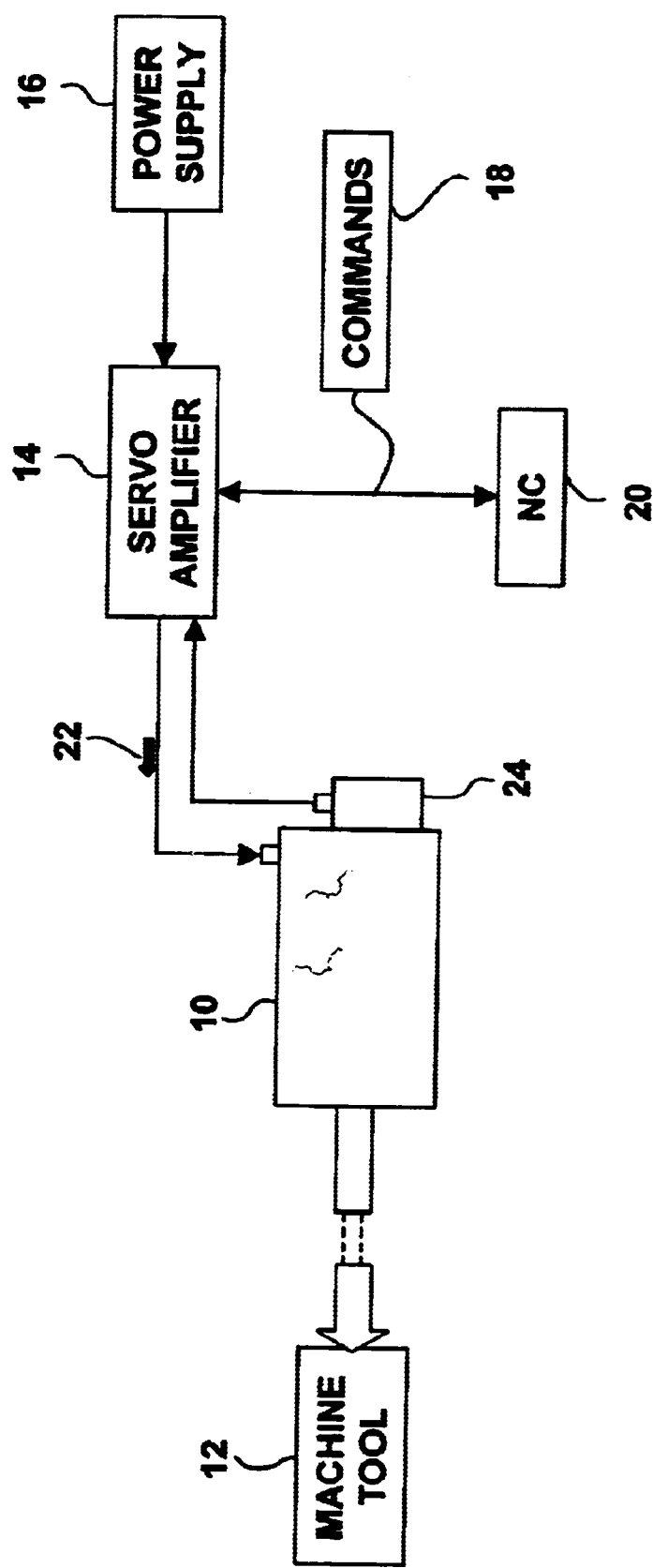
FIG. 1 is a block diagram of a system to which the inventive method and apparatus according to the invention may be applied.

The present invention is an automatic speed loop gain adjustment method and apparatus for a feedback control system. A block diagram of an arrangement to which the inventive method and apparatus may be applied is shown in FIG. 1. The arrangement includes a motor 10 that drives a machine tool 12. A servo amplifier 14 that is powered by a power supply 16 receives a position command and other commands 18 from a numerical control unit 20. Servo amplifier 14 generates a position control, a speed control, a current control, and other controls on the basis of this position command. Servo amplifier 14 generates a motor current 22 that is used to drive motor 10. Motor 10 ultimately drives machine tool 12. The position information of drive motor 10 is detected by an electromechanical device 24, such as an encoder.

Encoders are well known electromechanical devices used to monitor the motion of an operating mechanism. Such encoders employ speed transducers for detecting the angular speed of a motor and are functionally equivalent to frequency multipliers. That is, a complete revolution of a shaft of a motor actuates an encoder to generate a predetermined number of pulses. The predetermined number is technically referred to as a line count of the encoder. Therefore, the angular speed of the motor can be determined by measuring the frequency, i.e., pulses per second, of the output pulse train of the encoder. The larger the line count, the higher the speed measurement resolution becomes.

When an encoder is properly coupled to a motor, the encoder provides a useful output signal that precisely corresponds to incremental changes in the motor's position by generating a periodic signal whose rising and falling state transitions have a known and exact relationship to the mechanical motion of the motor. The frequency of this periodic signal precisely indicates the number of incremental position changes per unit time, and thus, precisely indicates the motor's speed. The average speed over the last period can be determined by measuring the time for that period and calculating it's frequency as 1/T period. With a relatively high resolution encoder, the time period can be sufficiently small so as to consider the velocity measurement to be instantaneous.

Figure 2:
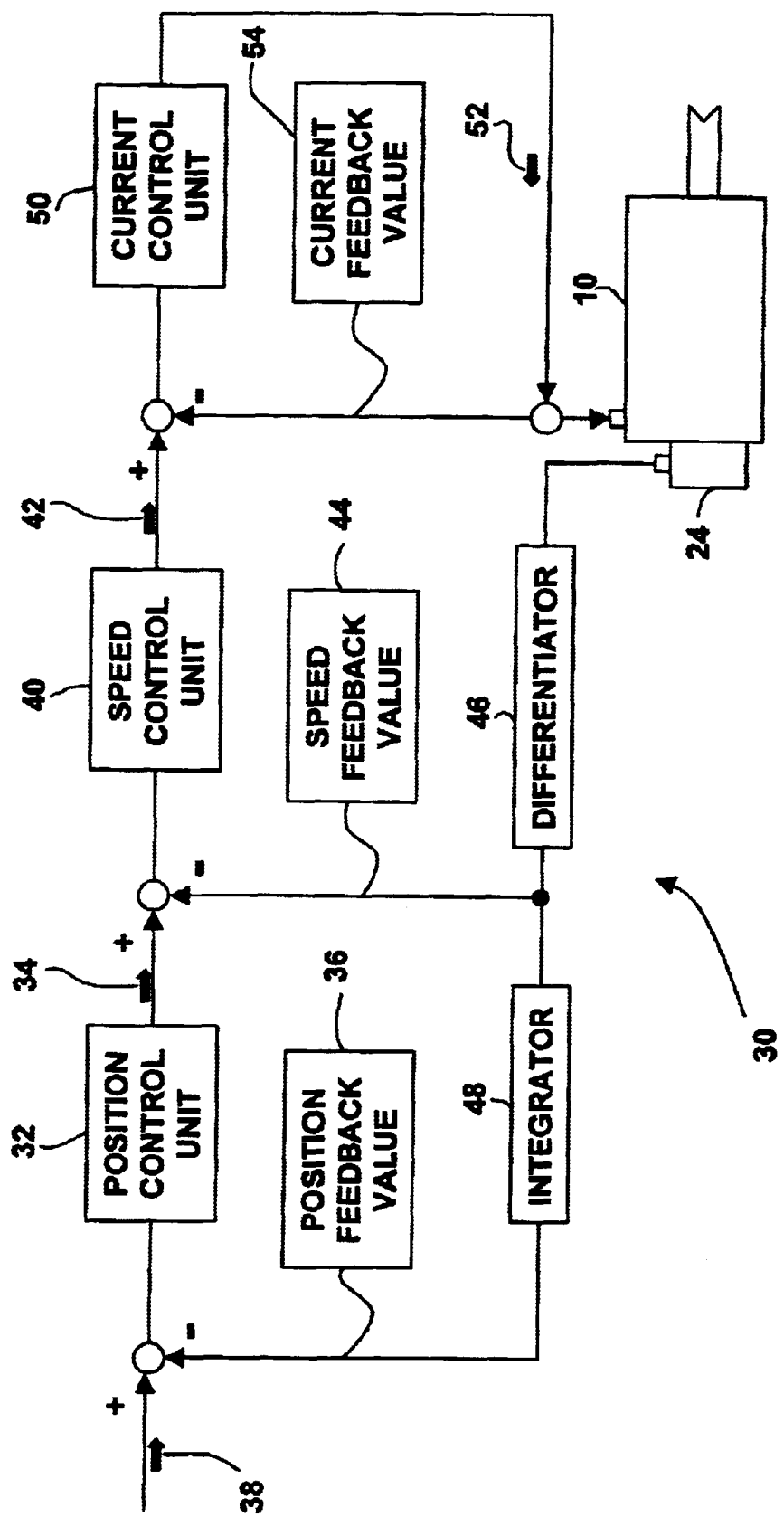
FIG. 2 is a block diagram showing an example of a feedback control system according to the invention.
Figure 3:
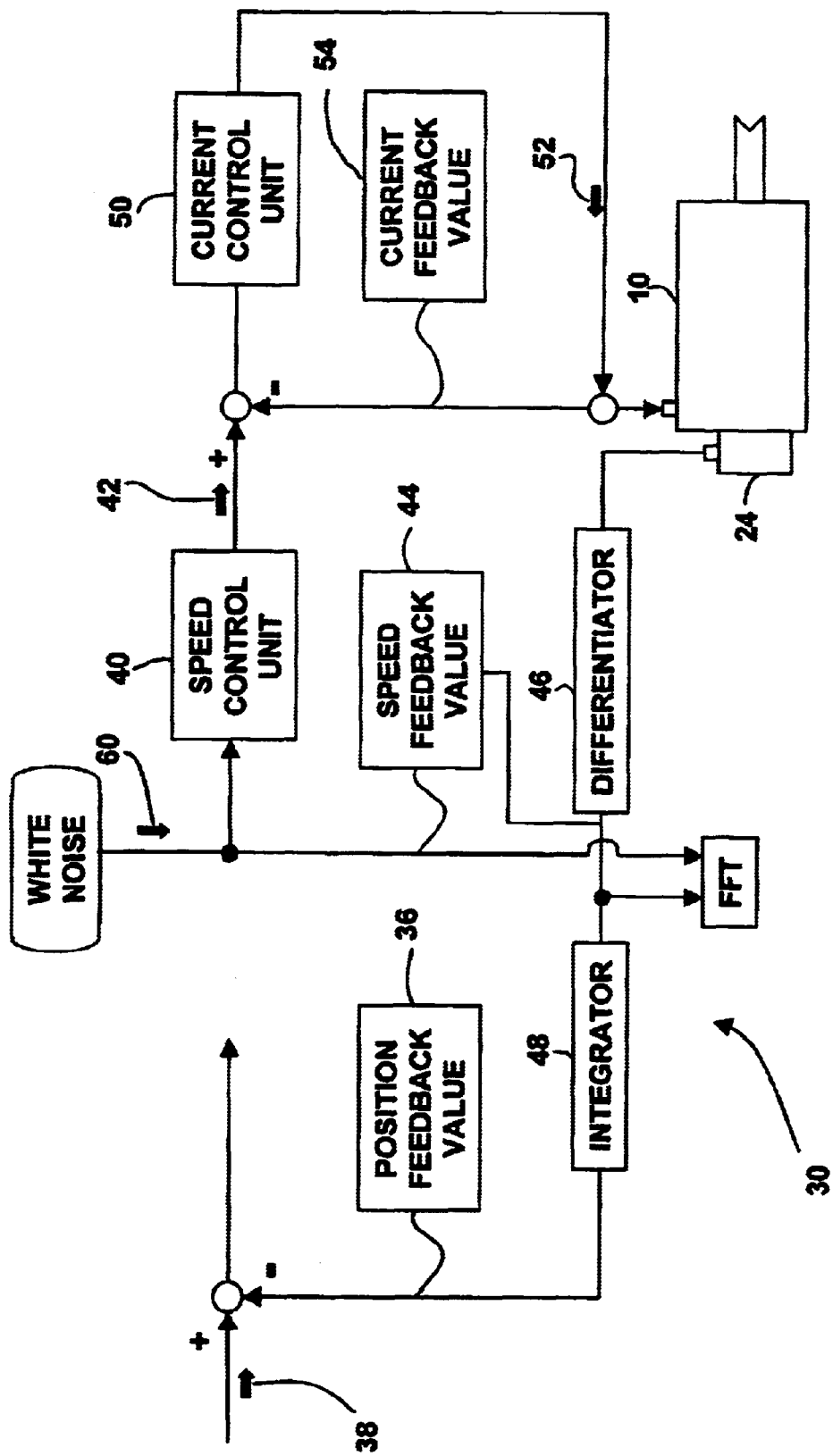
FIG. 3 is a block diagram showing the condition of the feedback control system at the time of white noise input.

The detected position information of motor 10 is fed back to servo amplifier 14 and is used to control drive motor 10 more precisely. FIGS. 2 and 3 show a block diagram of a feedback control system 30 for automatically adjusting the speed loop gain according to the invention. Feedback control system 30 comprises a position control loop, a speed control loop, and a current control loop. In the position control loop the deviation between the target position of the machine tool and its current position is calculated and a result obtained from the calculation is multiplied by a position loop gain so that a speed command is obtained. In the speed control loop the deviation between a value of the speed command obtained in the position control loop and the current speed is calculated and a result obtained from the calculation is multiplied by a speed loop gain so that a current command is obtained. In the current control loop the deviation between a value of the current command obtained in the speed control loop and an actual value of current flowing into the motor is calculated and a result obtained from the calculation is multiplied by a current loop gain so that a current command is obtained.

The position control loop includes a position control unit 32 for generating a speed command 34 based on a position deviation determined by position control unit 32. The position deviation is obtained by subtracting the position feedback value 36. The position feedback value 36 is provided by an integrator 48 through a differentiator 46 differentiating a signal detected by encoder 24 or the like from the value of the position command 38, and a speed command 34 is obtained by a position loop process in which the position deviation is multiplied by a position loop gain. The speed control loop includes a speed control unit 40 for generating a current command 42 based on a speed deviation determined by speed control unit 40, and a speed command 42 in which the speed deviation is multiplied by a speed loop gain. The speed deviation is obtained by subtracting the speed feedback value 44 provided by the differentiator 46 differentiating the signal detected by encoder 24 from the value of the speed command 34, and a speed command 42 is obtained by a speed loop process in which the speed deviation is multiplied by a speed loop gain. The current control loop includes a current control unit 50 for generating a current provided to motor 10 based on a difference between the value of the current command 52 outputted from speed control unit 40 and a current feedback value 54. Motor 10 rotates and drives machine tool 12.

Figure 4:
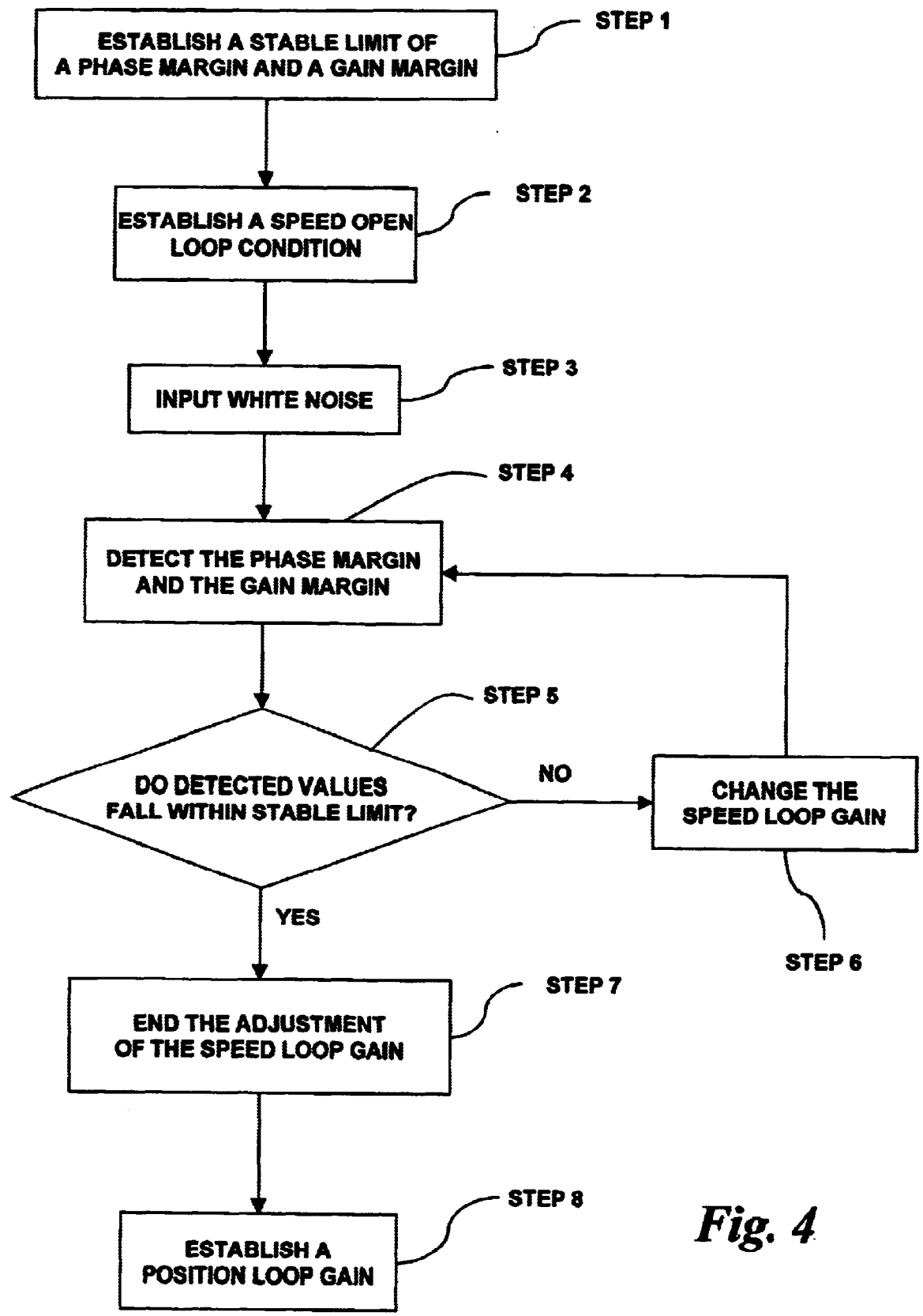
FIG. 4 is a flow chart showing an automatic speed loop gain adjustment method according to an embodiment of the present invention.

FIG. 4 is a flowchart showing the automatic speed loop gain adjustment method for a feedback control system according to an embodiment of the present invention. Referring to this flowchart, the method for automatically adjusting a speed loop gain in a feedback control system is hereinafter explained.

Figure 5:
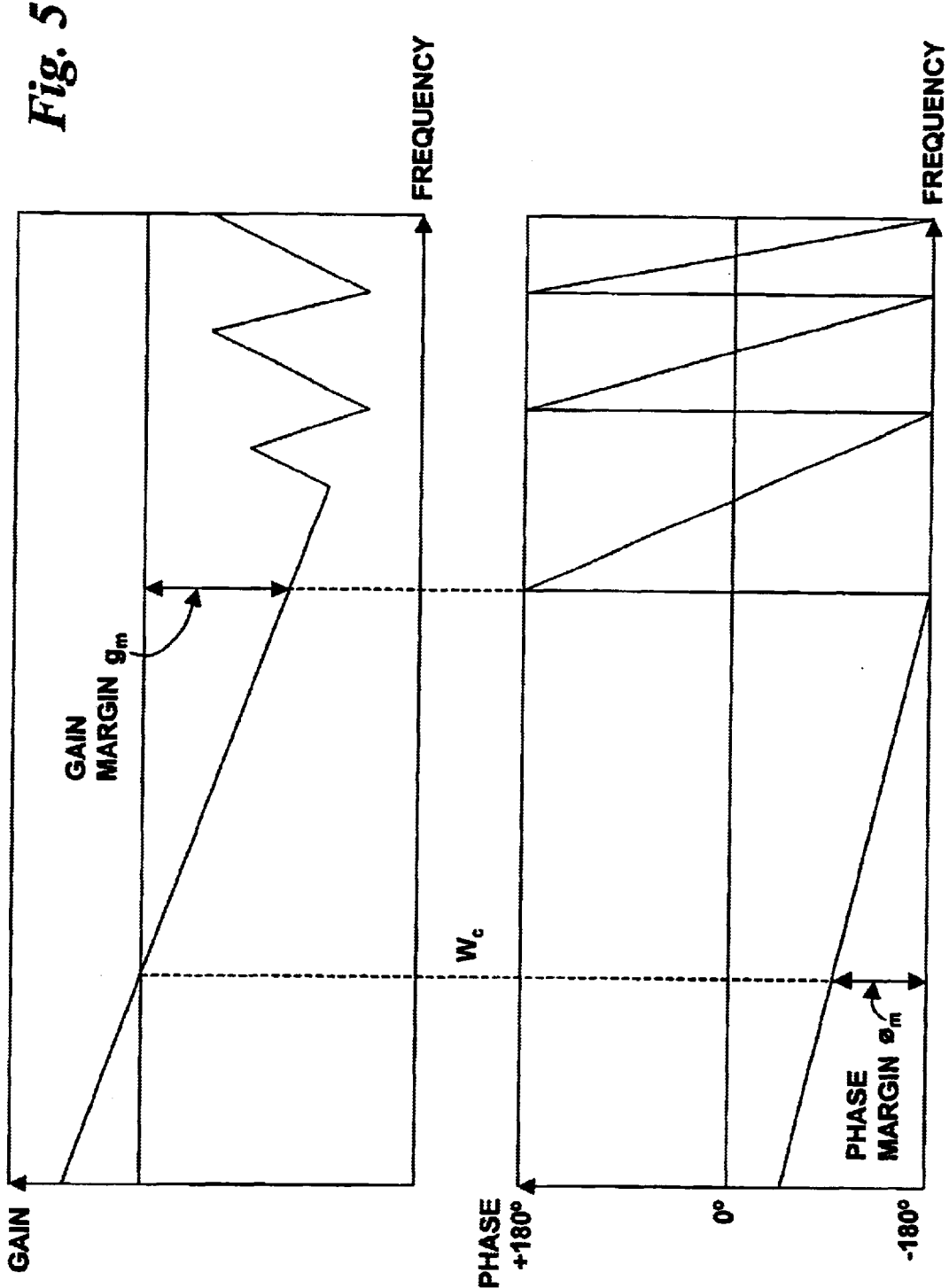
FIG. 5 is a diagram showing the details of a board diagram.

As shown in FIG. 5, parameters for judging whether feedback control system 30 is stable include a phase margin $Ø_m$ (degrees) and a gain margin $g_m$ (decibels). Initially, in STEP 1 a stable limit of the phase margin $Ø_m$ and the gain margin $g_m$ is set up, i.e. a predetermined phase margin range and a predetermined gain margin range are established.

Figure 6:
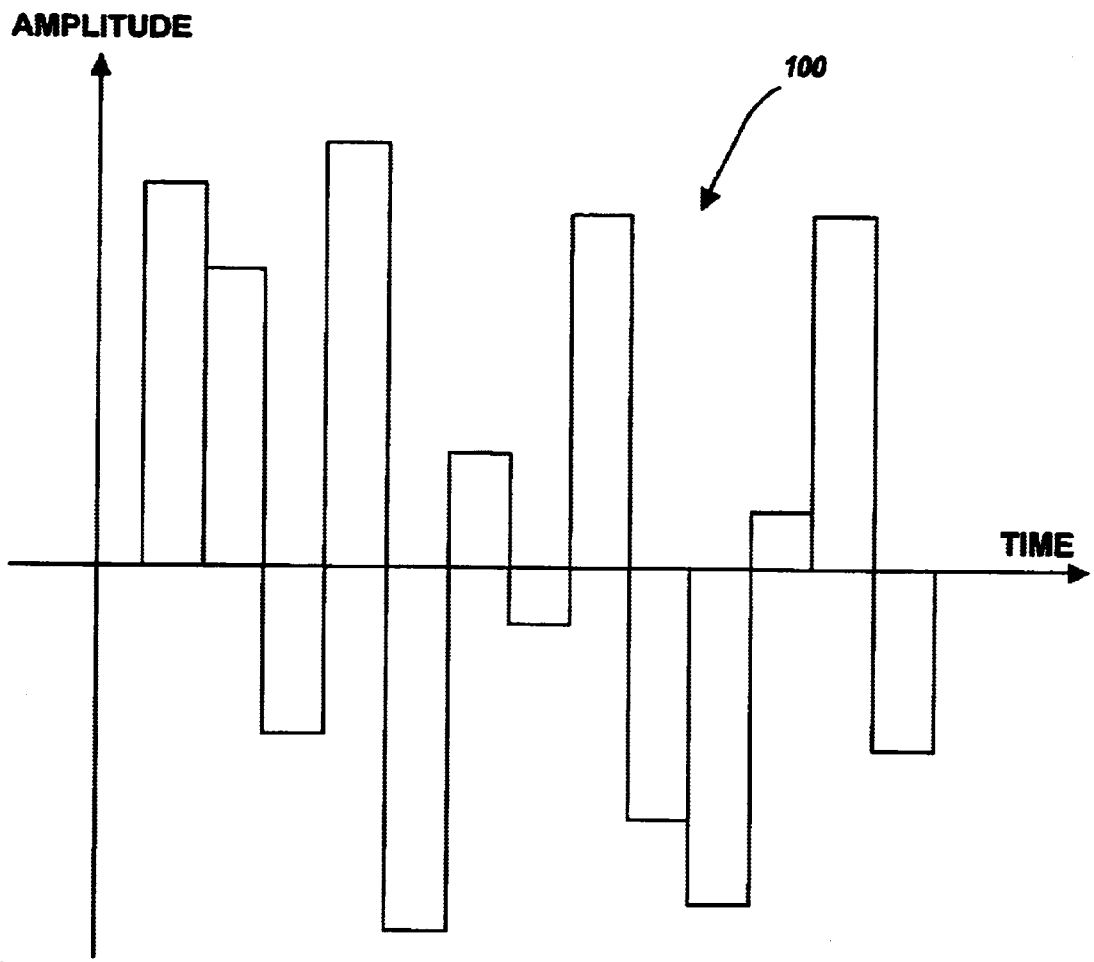
FIG. 6 is a diagram showing one cycle of white noise having a randomly generated amplitude.

Generally, a phase margin $Ø_m$ in a range of about 20° to 40°, and a gain margin $g_m$ in a range of about −10 dB to −20 dB is preferable. In STEP 2 a separation between the value of the speed command 34 and the speed feedback 44 is made which results in a speed open loop condition. In STEP 3 white noise 60 is input into feedback control system 30, as shown in FIG. 3. An example 100 of one cycle of white noise having a randomly generated amplitude is shown in FIG. 6. This cycle 100 corresponds to one control cycle of feedback control system 30.

Figure 7:
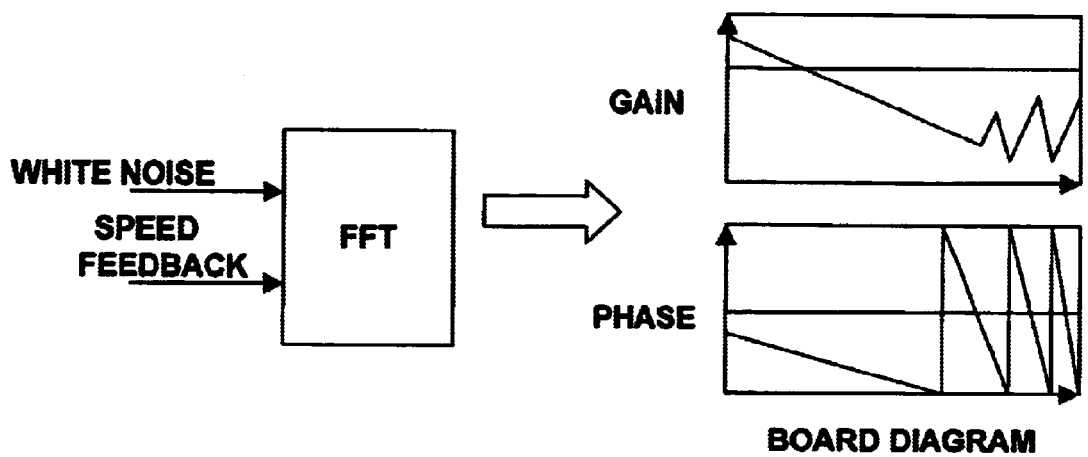
FIG. 7 is a schematic diagram showing the flow of board diagram preparation.

The phase margin $Ø_m$ and the gain margin $g_m$ of the frequency transmission function in the time that the white noise is input into the speed feedback control system is then determined in STEP 4. FIG. 7 illustrates how a Fast Fourier Transformation computation is utilized to generate a board diagram which is used to determine the phase margin $Ø_m$ and the gain margin $g_m$ of the frequency transmission function in the time that the white noise is input into the speed feedback control system. A board diagram is a diagram that illustrates gain (dBs) and phase (degrees) versus frequency. As shown in FIG. 7, gain and phase are represented along the upper and lower vertical axes, respectively, and frequency is represented along the upper and lower horizontal axes. The frequency at which the gain curve of this board diagram crosses 0 dB is the gain point of intersection frequency $w_c$. The phase margin $\emptyset_m$ is the difference in decibels between the phase (degrees) at that frequency $w_c$ and −180°. The gain margin $g_m$ is the difference between 0 dB and the gain curve at the frequency where the phase curve hits −180°. The phase margin $\emptyset_m$ and the gain margin $g_m$ are then compared with their associated predetermined gain margin range and predetermined phase margin range in STEP 5. If either one of the phase margin $\emptyset_m$ and gain margin $g_m$ fail to fall within the predetermined phase margin range and predetermined gain margin range, the feedback control system 30 is considered to be unstable and the speed loop gain is adjusted in STEP 6. The adjustment of the speed loop gain is effected by increasing the speed loop gain in a stepping state according to a predetermined unit quantity that is set up as a parameter. The speed loop gain is preferably limited to falling within a transformation range having an upper limit and a lower limit, wherein the theoretical upper limit gain value is adopted for the upper limit and a general experience value is adopted for the lower limit. These steps are subsequently repeated until both the detected phase margin $\emptyset_m$ and the detected gain margin $g_m$ fall within the predetermined phase margin range and predetermined gain margin range, respectively, whereupon the speed feedback control system is then considered to be stable. The adjustment of the speed loop gain is then ended in STEP 7. Once the adjustment of the speed loop gain complete, the position loop gain of the position control loop is adjusted on the basis of the adjusted speed loop gain in STEP 8. Preferably, the above described method steps are carried out automatically by the servo amplifier 14 so as to automatically stabilize the speed control loop.

In summary, an automatic speed loop gain adjustment method of a feedback control system comprises the steps of establishing a predetermined phase margin range and a predetermined gain margin range; creating a speed open loop condition by separating a speed command value from a speed feedback value; inputting white noise into the speed feedback control system at the time the white noise is input into the speed feedback control system; detecting a phase margin and a gain margin where the speed open loop condition has been made; comparing the detected phase margin and gain margin with the predetermined phase margin range and the predetermined gain margin range, respectively; adjusting the speed loop gain if the step of comparing results in either one of the detected phase margin and the detected gain margin falls outside of the associated predetermined phase margin range or predetermined gain margin range; and ending adjustment of the speed loop gain if the comparison results in both the detected phase margin and the detected gain margin falls within the associated predetermined phase margin range and the predetermined gain margin range. Once the adjustment of the speed loop gain is complete, the position loop gain of the position control loop is adjusted on the basis of the adjusted speed loop gain.

An automatic speed loop gain adjustment arrangement for a feedback control comprises a position control unit receiving a value of a position command value and a feedback position value to produce and output a speed command based on a deviation between the received value of the position command and the feedback position value; a speed control unit receiving a speed command and a speed feedback value to produce and output a speed command based on a deviation between the received value of the speed command and the feedback speed value; a current control unit receiving a current command and a feedback current value to produce and output a current command based on a deviation between the received value of the current command and the feedback current value; a white noise input element, provided between the position control unit and the speed control unit which upon reception of white noise, inhibits the transfer of the speed command to the speed command unit; gain margin and phase margin determination elements to determine a phase margin and a gain margin upon reception of white noise by the white noise input element; a comparison element to compare the determined phase margin with a predetermined phase margin range and the determined gain margin with a predetermined gain margin range; and, a speed loop gain adjustment element to adjust a speed loop gain if the comparison element determines if either one of the determined phase margin and the determined gain margin falls outside of the associated predetermined phase margin range or predetermined gain margin range. The feedback control arrangement may also include position loop gain adjustment element to adjust the position loop gain on the basis of the adjusted speed loop gain.

The foregoing description of the preferred embodiments is provided to enable any person skilled in the art to make or use the present invention. Various modifications to these embodiments are possible, and the generic principles presented herein may be applied to other embodiments as well.

As such, the present invention is not intended to be limited to the embodiments shown above but rather is to be accorded the widest scope consistent with the principles and novel features disclosed in any fashion herein.

We claim:

1. A method for automatically adjusting the speed loop gain of a speed feedback control system, comprising:
    establishing a predetermined phase margin range and a predetermined gain margin range;
    creating a speed open loop condition by separating a speed command value from a speed feedback value;
    inputting white noise into the speed feedback control system where the speed open loop condition has been made;
    detecting a phase margin and a gain margin at the time the white noise is input into the speed feedback control system;
    comparing the detected phase margin and the detected gain margin with the predetermined phase margin range and the predetermined gain margin range, respectively;
    adjusting the speed loop gain if the step of comparing results for either one of the detected phase margin and the detected gain margin falls outside of the associated predetermined phase margin range or predetermined gain margin range; and,
    ending adjusting the speed loop gain if the step of comparing results of both the detected phase margin and the detected gain margin falls within the associated predetermined phase margin range and the predetermined gain margin range.

2. The method according to claim 1, further comprising adjusting a position loop gain of a position control loop which produces a speed command value based on a deviation between a position command value and a position feedback value, once the step of adjusting the speed loop gain is complete, wherein the position loop gain is adjusted on the basis of the adjusted speed loop gain.

3. The method according to claim 1, wherein the step of inputting white noise occurs in a cycle that is substantially the same as a control cycle of the speed feedback control system.

4. The method according to claim 3, further comprising adjusting a position loop gain of a position control loop once the step of adjusting the speed loop gain is complete, wherein the position loop gain is adjusted on the basis of the adjusted speed loop gain.

5. The method according to claim 1, wherein the step of adjusting the speed loop gain is effected by increasing the speed loop gain step by step according to a predetermined unit quantity that is set up as a parameter beforehand, wherein the speed loop gain does not exceed a predetermined speed loop gain range.

6. The method according to claim 5, further comprising adjusting a position loop gain of a position control loop which produces a speed command value based on a deviation between a position command value and a position feedback value, once the step of adjusting the speed loop gain is complete, wherein the position loop gain is adjusted on the basis of the adjusted speed loop gain.

7. The method according to claim 5, wherein the step of inputting white noise occurs in a cycle that is substantially the same as a control cycle of the speed feedback control system.

8. The method according to claim 7 further comprising adjusting a position loop gain of a position control loop which produces a speed command value based on a deviation between a position command value and a position feedback value, once the step of adjusting the speed loop gain is complete, wherein the position loop gain is adjusted on the basis of the adjusted speed loop gain.

9. A feedback control arrangement for feeding back speed information detected by a speed detection device for detecting the speed of a movable part, said feedback control system comprising:

a position control unit to receive a position command value and a feedback position value, and to produce and output a speed command value based on a deviation between the received position command value and the feedback position value;

a speed control unit to receive a speed command value and a speed feedback value, and to produce and output a current command value based on a deviation between the received speed command value and the feedback speed value;

a current control unit to receive the current command value and a feedback current value, and to produce and output a current command value based on a deviation between the received current command value and the feedback current value;

a white noise input element, provided between the position control unit and the speed control unit, which upon reception of white noise, inhibits the transfer of the speed command value to the speed command unit;

gain margin and phase margin determination elements to determine a phase margin and a gain margin upon reception of white noise by said white noise input element;

a comparison element to compare the determined phase margin with a predetermined phase margin range and the determined gain margin with a predetermined gain margin range; and, a speed loop gain adjustment element to adjust a speed loop gain if the comparison means determines if either one of the determined phase margin and the determined gain margin falls outside of the associated predetermined phase margin range or predetermined gain margin range.

10. The feedback control arrangement according to claim 9, further comprising a position loop gain adjustment element to adjust the position loop gain on the basis of the adjusted speed loop gain.

* * * * *